(12) United States Patent
Kurokawa et al.

(10) Patent No.: US 6,827,849 B2
(45) Date of Patent: Dec. 7, 2004

(54) FOOT WARM BATH EQUIPMENT (75) Inventors: Keiko Kurokawa, Gunma (JP);
Masayuki Motegi, Gunma (JP);
Daisuke Suzuki, Gunma (JP);
Toshimitsu Tsukui, Gunma (JP)

(73) Assignee: Sanyo Electric Co., Ltd, Osaka (JP)

( * ) Notice: Subject to any disclaimer, the term of this patent is extended or adjusted under 35 U.S.C. 154(b) by 50 days.

(21) Appl. No.: 10/317,603

(22) Filed: Dec. 12, 2002

(65) Prior Publication Data

US 2004/0010845 A1 Jan. 22, 2004

(30) Foreign Application Priority Data

Dec. 14, 2001 (JP) .......................... 2001/381663
Dec. 14, 2001 (JP) .......................... 2001/381673

(51) Int. Cl.[7] .................. A61H 35/00; A47K 3/022; C02F 1/461
(52) U.S. Cl. .................. 210/175; 210/192; 204/228.2; 204/228.6; 607/86
(58) Field of Search .................. 210/175, 192; 204/193, 228.1, 228.2, 226.6; 4/524, 545, 574.1, 622; 607/86

(56) References Cited

U.S. PATENT DOCUMENTS

| | | |
|---|---|---|
| 3,669,857 A | 6/1972 | Kirkham et al. |
| 4,497,313 A | 2/1985 | Kurosawa |
| 5,220,696 A | 6/1993 | Dannenberg et al. |
| 5,729,841 A * | 3/1998 | Chan .............................. 4/622 |
| 6,174,419 B1 | 1/2001 | Akiyama |

FOREIGN PATENT DOCUMENTS

| | | |
|---|---|---|
| DK | 34 10999 C1 | 4/1985 |
| EP | 1 426 017 A1 | 2/1976 |
| EP | 2 314 015 A1 | 12/1997 |
| JP | 8-257093 | * 10/1996 |

* cited by examiner

*Primary Examiner*—Fred G. Prince
(74) *Attorney, Agent, or Firm*—Darby & Darby (57) ABSTRACT

Sanitary foot warm bath equipment is provided which prevents or suppresses proliferation of saprophytic bacteria in a foot bath. The foot warm bath equipment is foot warm bath equipment which reserves hot water for foot bathing in a foot bath, the equipment comprising heating means for heating water in the foot bath to produce hot water of setting temperature, electrolytic water producing means for producing electrolytic water containing hypochlorous acid by electrolyzing the water, and control means for controlling the heating means and the electrolytic water producing means, wherein the electrolytic water produced by the electrolytic water producing means is supplied into the foot bath.

10 Claims, 11 Drawing Sheets

FOOT WARM BATH EQUIPMENT

BACKGROUND OF THE INVENTION

1. Field of the Invention

The present invention relates to foot warm bath equipment for warming feet by use of hot water.

2. Description of the Related Art

Conventional foot warm bath equipment is disclosed in Japanese Patent Application Laid-Open No. 258986/2001, for example. More specifically, foot warm bath equipment of this type is known to be useful for relieving one's fatigue and maintaining good health. In this type of foot warm bath equipment, water is filled into a foot warm bath having a dimensional volume which allows the bath to accommodate both feet, and the water is heated to hot water of setting temperature. Then, when one immerses both feet (bare feet) in the hot water, his body is warmed through skins of the feet, and heat is carried through his whole body by flow of blood, thereby improving blood circulation.

Since feet (bare feet) are immersed in the hot water in the foot warm bath of the foot warm bath equipment as described above, various types of saprophytic bacteria and dirt stuck on skins of the feet are dissolved in the hot water. Therefore, saprophytic bacteria are liable to proliferate in the hot water in the foot warm bath, so that frequent replacement of hot water and frequent cleaning of the foot warm bath are required and there is a possibility that skins of feet may be infected with proliferated saprophytic bacteria.

SUMMARY OF THE INVENTION

The present invention has been conceived so as to solve the technical problem of the prior art. An object of the present invention is to provide foot warm bath equipment which remains sanitary by preventing or suppressing proliferation of saprophytic bacteria in a foot bath.

Foot warm bath equipment of the present invention is foot warm bath equipment which reserves hot water for foot bathing in a foot bath, the equipment comprising heating means for producing hot water of setting temperature by heating water in the foot bath, electrolytic water producing means for producing electrolytic water containing hypochlorous acid by electrolyzing the water, and control means for controlling these heating means and electrolytic water producing means, wherein electrolytic water produced by the electrolytic water producing means is fed into the foot bath.

According to the present invention, since the foot warm bath equipment which reserves hot water for foot bathing in a foot bath comprises the heating means for producing hot water of setting temperature by heating water in the foot bath, the electrolytic water producing means for producing electrolytic water containing hypochlorous acid by electrolysis of water and the control means for controlling these heating means and electrolytic water producing means and since electrolytic water produced by the electrolytic water producing means is fed into the foot bath, proliferation of saprophytic bacteria can be prevented or suppressed and a sanitary foot warm bathing effect can be achieved by hypochlorous acid fed into the foot bath.

Further, since surfaces of skins of feet can also be sterilized, an effect of promoting health by foot bathing can be further improved.

Further, in the foot warm bath equipment of the present invention, the electrolytic water producing means electrolyzes water in the foot bath, and the control means controls the electrolytic water producing means to produce electrolytic water on condition that the level of the water in the foot bath is equal to or higher than a predetermined value.

According to the present invention, since the electrolytic water producing means electrolyzes the water in the foot bath, and the control means controls the electrolytic water producing means to produce electrolytic water on condition that the level of the water in the foot bath is equal to or higher than the predetermined value, an excessive increase in concentration of hypochlorous acid in the foot bath can be prevented, and the concentration of hypochlorous acid in the hot water can be maintained at a proper value.

Further, in the foot warm bath equipment of the present invention, after production of the electrolytic water by the electrolytic water producing means, the control means controls the heating means to heat the electrolytic water.

According to the present invention, since the control means controls the heating means to heat the electrolytic water produced by the electrolytic water producing means, an inconvenience that the concentration of hypochlorous acid in the foot bath is increased higher than necessary by electrolysis of high-temperature water can be avoided in advance.

Further, in the foot warm bath equipment of the present invention, the control means determines time for producing the electrolytic water by the electrolytic water producing means based on the concentration of chlorine remaining in the water.

According to the present invention, since the control means determines the time for producing the electrolytic water by the electrolytic water producing means based on the concentration of chlorine remaining in the water, the concentration of hypochlorous acid in the foot bath can be maintained at a proper value accurately.

Further, the foot warm bath equipment of the present invention further comprises air bubble generating means for generating air bubbles in the foot bath, and the control means raises the setting temperature of the hot water in the foot bath when air bubbles are generated by the air bubble generating means.

According to the present invention, since the equipment has the air bubble generating means for generating air bubbles in the foot bath, feet can be massaged by generated air bubbles, and a uniform concentration of hypochlorous acid in the foot bath can be achieved by stirring the hypochlorous acid in the foot bath. Further, since the control means raises the setting temperature of the hot water in the foot bath when air bubbles are generated by the air bubble generating means, the temperature of the hot water whose decrease is promoted by generation of the air bubbles can be maintained at a suitable value.

Further, foot warm bath equipment of the present invention is foot warm bath equipment which reserves hot water for foot bathing in a foot bath, the equipment comprising electrolytic water producing means for producing electrolytic water containing hypochlorous acid by electrolyzing water in the foot bath, and control means for controlling the electrolytic water producing means, wherein the control means controls the electrolytic water producing means to produce electrolytic water intermittently.

According to the present invention, since the foot warm bath equipment which reserves hot water for foot bathing in a foot bath comprises the electrolytic water producing means for producing electrolytic water containing hypochlorous acid by electrolyzing water in the foot bath, proliferation of saprophytic bacteria can be prevented or suppressed and a sanitary foot warm bathing effect can be achieved by hypochlorous acid fed into the foot bath. Further, sterilization of surfaces of skins of feet can be performed.

Particularly, since the equipment has the control means for controlling the electrolytic water producing means and the control means controls the electrolytic water producing means to produce electrolytic water intermittently, hypochlorous acid in the hot water can be maintained in a predetermined concentration during foot warm bathing, and the effect of preventing or suppressing proliferation of saprophytic bacteria in the warm bath and the effect of sterilizing feet can be exhibited without any problems.

Further, in the foot warm bath equipment of the present invention, the control means determines a time period in which electrolytic water is produced by the electrolytic water producing means, based on the concentration of chlorine remaining in the water in the foot bath.

Further, according to the present invention, since the control means determines the time period in which electrolytic water is produced by the electrolytic water producing means, based on the concentration of chlorine remaining in the water in the foot bath, the concentration of hypochlorous acid generated by electrolysis can be controlled adequately.

Further, the foot warm bath equipment of the present invention further comprises air bubble generating means for generating air bubbles in the foot bath, and the control means extends the time period in which electrolytic water is produced by the electrolytic water producing means when air bubbles are generated by the air bubble generating means.

According to the present invention, since the equipment further comprises the air bubble generating means for generating air bubbles in the foot bath, feet can be massaged by the air bubbles, and efficient contact of the feet with hypochlorous acid can be achieved. Particularly, since the control means extends the time period in which electrolytic water is produced by the electrolytic water producing means so as to produce as much electrolytic water as possible when air bubbles are generated by the air bubble generating means, the concentration of hypochlorous acid whose decomposition is promoted by contacting with feet can be maintained without any problems.

Further, the foot warm bath equipment of the present invention further comprises air bubble generating means for generating air bubbles in the foot bath, and the control means shortens a period in which electrolytic water is produced by the electrolytic water producing means when air bubbles are generated by the air bubble generating means.

According to the present invention, since the equipment further comprises the air bubble generating means for generating air bubbles in the foot bath, feet can be massaged by the air bubbles, and efficient contact of the feet with hypochlorous acid can be achieved. Particularly, since the control means shortens the period in which electrolytic water is produced by the electrolytic water producing means so as to produce as much electrolytic water as possible when air bubbles are generated by the air bubble generating means, the concentration of hypochlorous acid whose decomposition is promoted by contacting with feet can be maintained without any problems.

Further, the foot warm bath equipment of the present invention further comprises foot detecting means for detecting that feet are put in the foot bath, and based on an output from the foot detecting means, the control means controls the electrolytic water producing means to produce electrolytic water intermittently on condition that feet are present in the foot bath.

According to the present invention, since the equipment further comprises the foot detecting means for detecting that feet are put in the foot bath and the control means controls the electrolytic water producing means to produce electrolytic water intermittently based on an output from the foot detecting means on condition that feet are present in the foot bath, production of electrolytic water can be stopped when feet are not present in the foot bath, an excessive increase in the concentration of hypochlorous acid can be prevented, and energy conservation can be accomplished.

DETAILED DESCRIPTION OF THE PREFERRED EMBODIMENT

Figure 1:
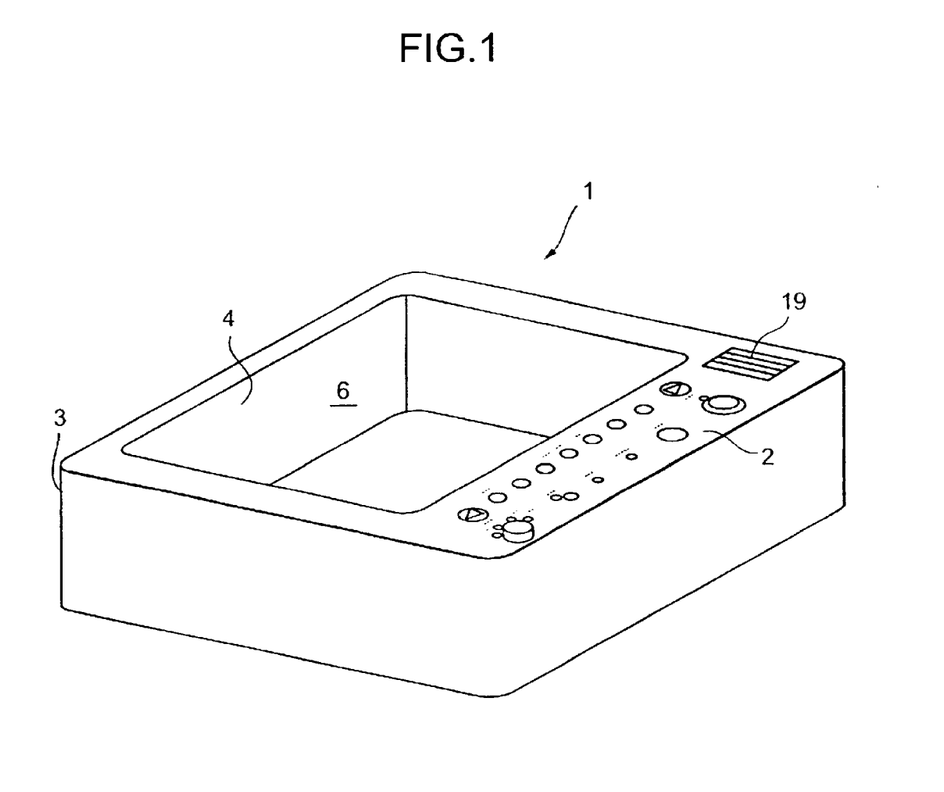
FIG. 1 is an oblique perspective view of foot warm bath equipment of an embodiment of the present invention.
Figure 2:
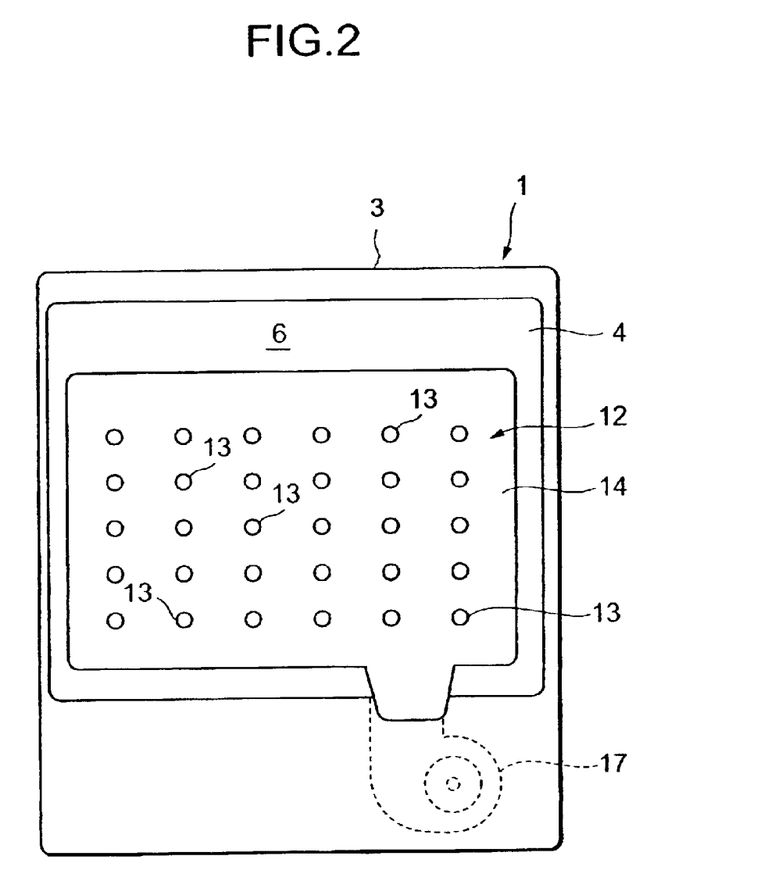
FIG. 2 is an overhead view of the foot warm bath equipment of FIG. 1.
Figure 3:
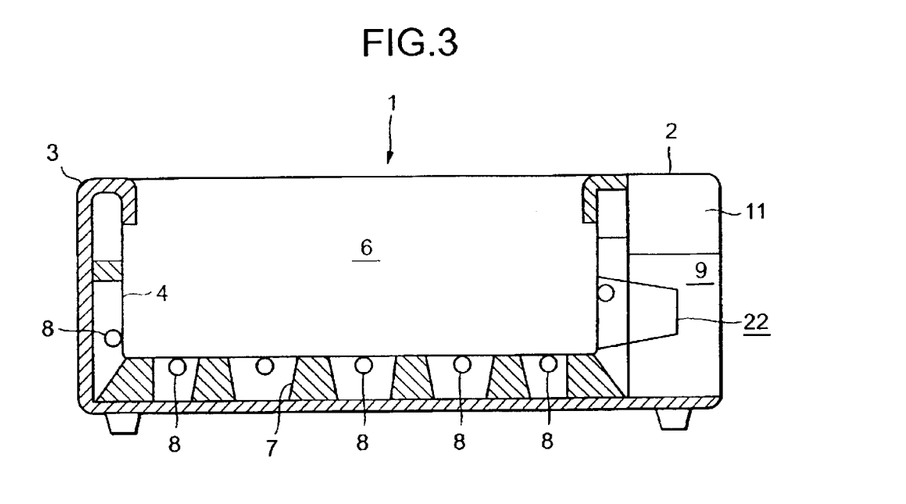
FIG. 3 is a longitudinal sectional side view of the foot warm bath equipment of FIG. 1.

Hereinafter, an embodiment of the present invention will be described with reference to the drawings. FIG. 1 is an oblique perspective view of foot warm bath equipment 1 of an embodiment of the present invention, FIG. 2 is an overhead view of the foot warm bath equipment 1 without a control panel 2, and FIG. 3 is a longitudinal sectional side view of the foot warm bath equipment 1. In these figures, the foot warm bath equipment 1 of the present embodiment comprises a nearly rectangular enclosure 3 which has an opening on a top surface and a nearly rectangular inner box 4 which is placed in the opening of the enclosure 3 and opens upward, and the inside of the inner box 4 serves as a foot bath 6 which opens upward.

Figure 4:
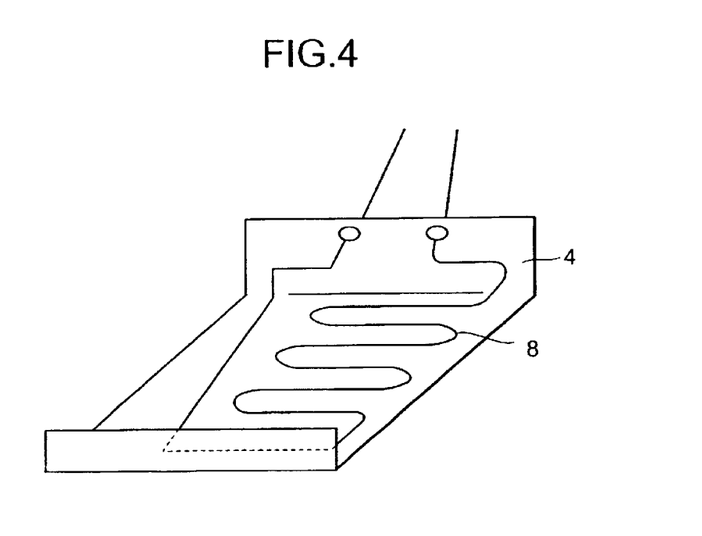
FIG. 4 is an oblique perspective view of a portion of an inner box and an electric heater in the foot warm bath equipment of FIG. 1.

A thermal insulating material 7 is provided between the external surface of the inner box 4 and the enclosure 3, and by use of grooves formed on the thermal insulating material 7, an electric heater 8 as heating means is attached to the external surface of the inner box 4 in a meandering manner as shown in FIG. 4. On a top surface on the front side of the enclosure 3, a control panel 2 is provided. In (or under) the control panel 2, an electrical chamber 9 is provided between the enclosure 3 and the inner box 4. In an upper portion in the electrical chamber 9, a control device 11 to be described later will be accommodated, and ends of the above electric heater 8 are also lead into the electrical chamber 9

Figure 5:
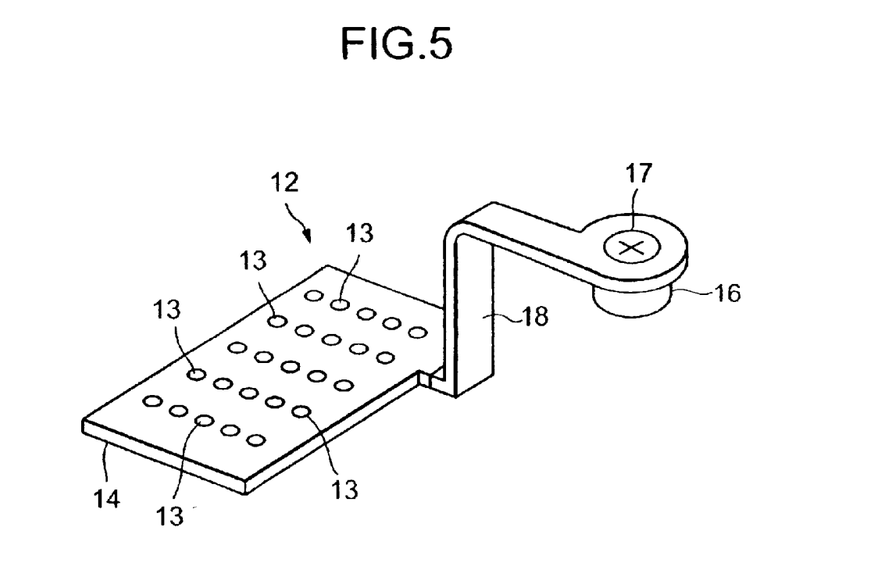
FIG. 5 is an oblique perspective view of an air bubble generator in the foot warm bath equipment of FIG. 1.

FIG. 5 shows an air bubble generating device 12 as air bubble generating means. The air bubble generating device 12 comprises a bedding part 14 which is laid freely detachably at the inner bottom of the foot bath 6 and has a plurality of discharge pores on a top surface as shown in FIG. 2, a sirocco fan (blower) 17 which is driven by a motor 16, and a vertical duct 18 which communicates the discharge side of the sirocco fan 17 with the inside of the bedding part 14 (in FIGS. 1 and 3, the bedding part 14 is detached).

Of these, the motor 16, the sirocco fan 17 and the duct 18 are housed in the electrical chamber 9, and the bedding part 14 is detachably connected to a lower opening 18A of the duct 18. Then, when the sirocco fan 17 is driven by the motor 16, air (outside air) is sucked into the duct 18 from an air intake 19 which is formed on the control panel 2. The air sucked into the duct 18 enters the bedding part 14 and is then discharged in the foot bath 6 from a plurality of discharge pores 13 as air bubbles.

Figure 6:
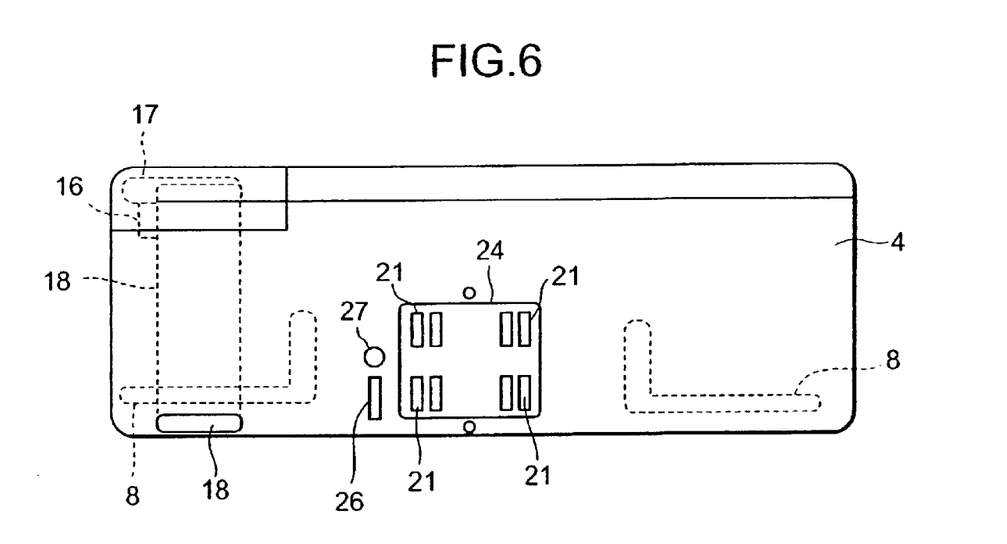
FIG. 6 is a front view of an inner box in a slit portion of the foot warm bath equipment of FIG. 1.
Figure 7:
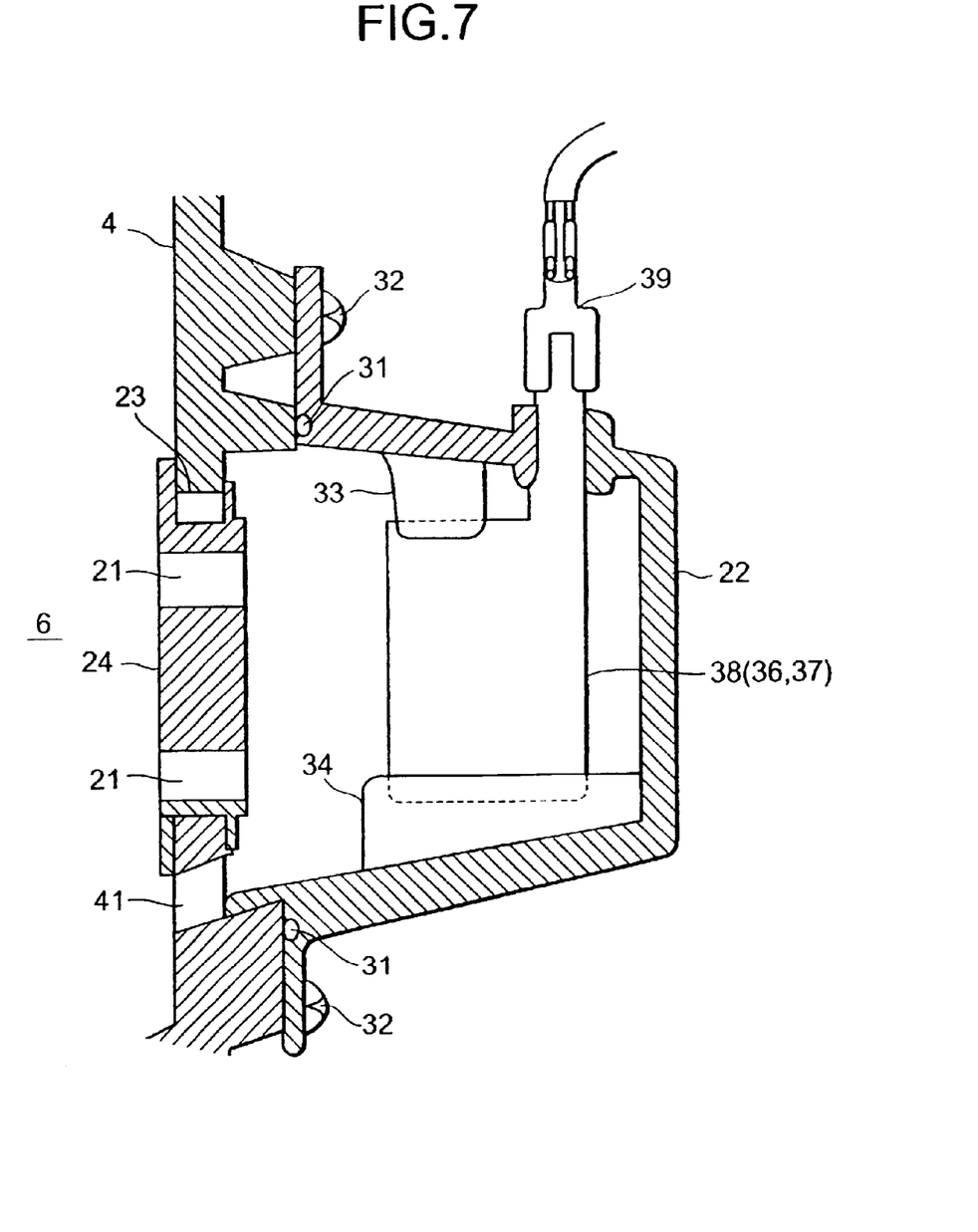
FIG. 7 is an enlarged longitudinal sectional side view of an electrode box portion of the foot warm bath equipment of FIG. 1.
Figure 8:
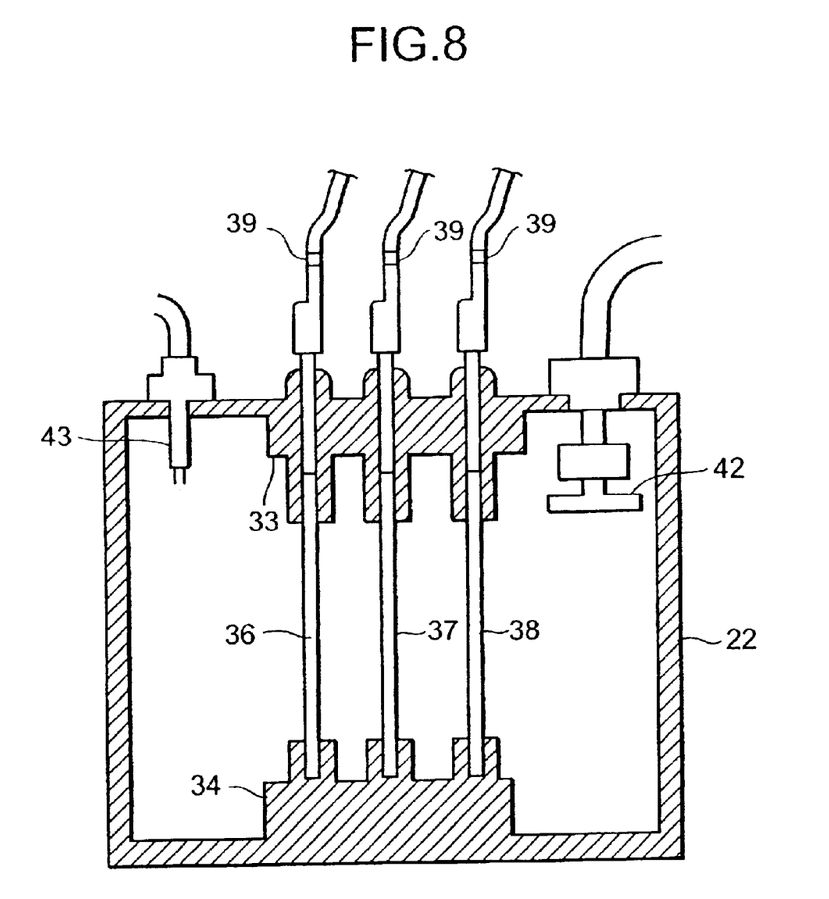
FIG. 8 is a longitudinal sectional front view of the electrode box of the foot warm bath equipment of FIG. 1.

Further, on a surface of a wall of the inner box 4 which faces the electrical chamber 9, a rectangular opening 23 is formed, and a slit member 24 which has a plurality of slits 21 formed thereon is attached to the opening 23. At a position on an external surface of the inner box 4 which corresponds to the slit member 24, an electrode box 22 is attached. FIG. 6 shows the slit member 24 viewed from the inside of the inner box 4, FIG. 7 shows an enlarged longitudinal sectional side view of the inner box 4 of the electrode box 22 portion, and FIG. 8 shows a longitudinal sectional front view of the electrode box 22.

The electrode box 22 appears to be a nearly rectangular container with its side to face the inner box 4 opened and is attached to the inner box 4 by means of screws 32 via rubber packing 31 so as to close the opening 23 of the inner box 4 from outside. In the electrode box 22, three electrodes 36, 37 and 38 which constitute electrolytic water producing means are held at given intervals by upper and lower holders 33 and 34, and to the electrodes 36, 37 and 38, lead wires 39 from above the electrode box 22 are connected. The other ends of the lead wires 39 are connected to the control device 11.

In this case, a potential of the same polarity is applied to the electrodes 36 and 38 and a potential of the opposite polarity is applied to the electrode 37 between the electrodes 36 and 38 so as to carry out electrolysis of water. Although three electrodes are provided in the present embodiment, it is satisfactory as long as at least a pair of electrodes are provided. Reference numeral 41 denotes an outlet formed under the slit member 24. Upon discharge of water from the electrode box 24, the water can be smoothly discharged from the outlet 41 into the foot bath 6.

Further, on an upper wall inside the electrode box 22, a float switch 42 as water level detecting means and a residual chlorine concentration sensor 43 as means for detecting the concentration of residual chlorine are provided. The float switch 42 is positioned, for example, at a certain water level or height (in the present embodiment, about 17 cm from the bottom of the foot bath 6 (bedding part 14)) where all the electrodes 36 to 38 are completely submerged in water poured in the foot bath 6. Meanwhile, the residual chlorine concentration sensor 43 detects the concentration of residual chlorine from conductivity of water poured in the foot bath 6 and flown into the electrode box 22 and outputs the result.

In addition, on an internal surface of the inner box 4 adjacent to the slit member 24, a thermistor 26 as temperature detecting means and an optical sensor 27 as foot detecting means are installed. The thermistor 26 is an element in which a resistance value changes with a negative characteristic based on the temperature of water (hot water) in the foot bath 6. As for the optical sensor 27, an amount of received light changes due to the presence of feet in the foot bath 6.

Figure 9:
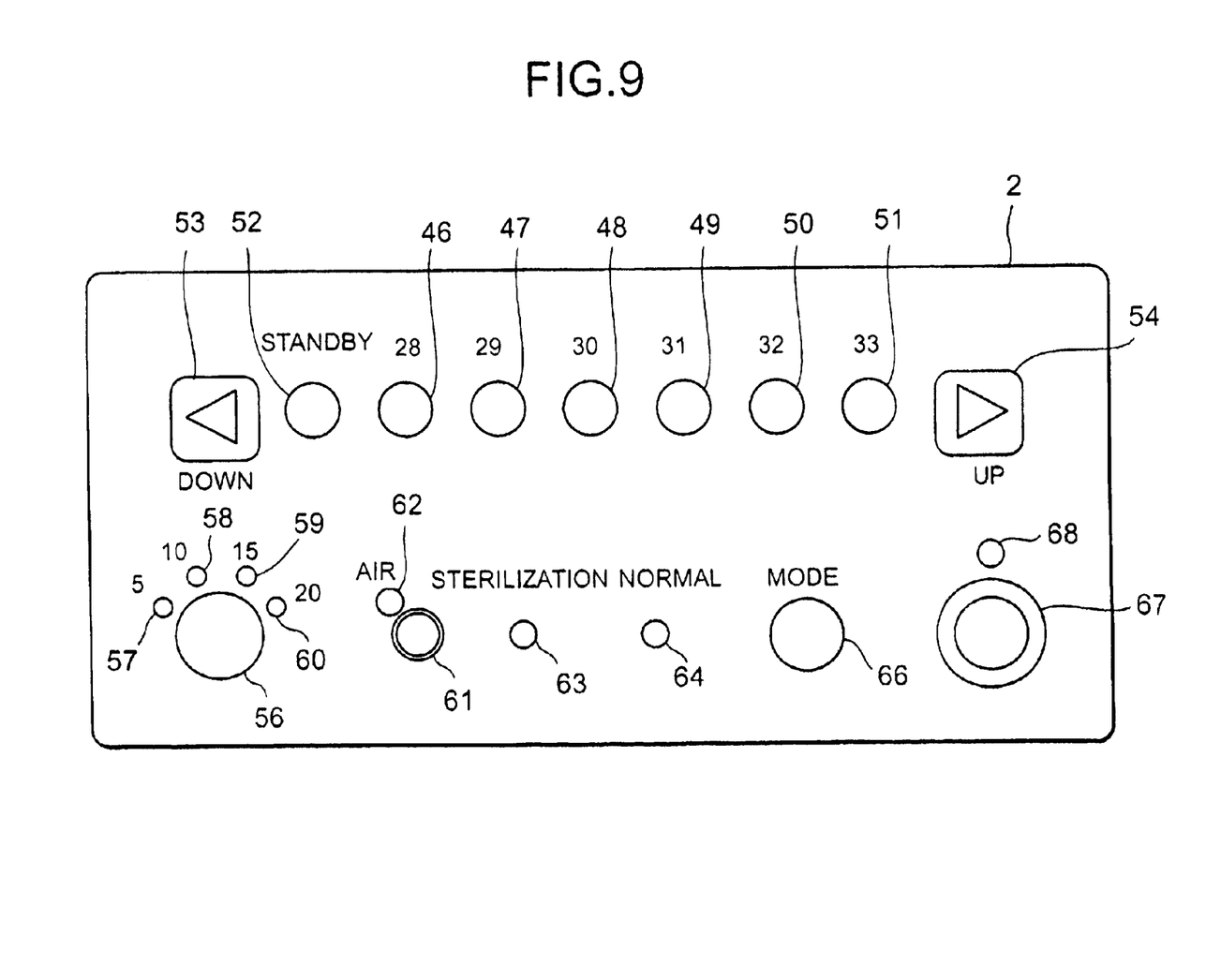
FIG. 9 is a front view of a control panel of the foot warm bath equipment of FIG. 1.

FIG. 9 shows an enlarged front view of the control panel 2. On the control panel 2, LEDs 46 to 51 for displaying setting temperatures of +28° C. to −33° C. are provided linearly in its upper portion, and on the left of these LEDs, a standby LED 52 for displaying a standby status until completion of electrolysis is provided. Further, on the left and right of these LEDs, a DOWN switch 53 and an UP switch 54 for decreasing and increasing the setting temperature are provided, respectively.

In a lower portion of the control panel 2, from its left to right, an operation timer switch 56, LEDs 57 to 60 for indicating operation times of 5, 10, 15 and 20 minutes, an air switch 61, an air generation LED 62, a sterilization mode LED 63, a normal mode LED 64, a mode switch 66, an operation switch 67, and an operation LED 68 are provided.

When the operation switch 67 is pressed to be ON, the operation LED 68 is lit, and when the operation switch 67 is pressed again to be OFF, the operation LED 68 is turned off. An operation mode is initially a normal mode, and the normal mode LED 64 is lit (the sterilization mode LED 63 is not lit). Then, when the mode switch 66 is pressed once, the operation mode is switched to a sterilization mode, and the sterilization mode LED 63 is lit (the normal mode LED 64 is not lit). When the air switch 61 is pressed once, the sirocco fan 17 is driven by the motor 16, and the air generation LED 62 is lit. Then, when the air switch 61 is pressed again, the sirocco fan 17 is stopped, and the air generation LED 62 is turned off. The operation timer switch 56 is initially set at 15 minutes, so that only the operation display LED 59 corresponding to 15 minutes is lit. Then, when the operation timer switch 56 is pressed once, the setting time is switch to 20 minutes, so that only the operation display LED 60 corresponding to 20 minutes is lit. Then, when the operation timer switch 56 is pressed again, the setting time is switch to 5 minutes, so that only the operation display LED 57 corresponding to 5 minutes is lit, and when the operation timer switch 56 is pressed once more, the setting time is switch to 10 minutes, so that only the operation display LED 58 corresponding to 10 minutes is lit.

As for temperature setting, the setting temperature is initially +30° C. Each time the UP switch 54 is pressed down, the setting temperature is increased by 1° C., and eventually, the setting temperature can be increased to +33° C. Thus, the LED 48 is lit in an initial state, and each time the UP switch 54 is pressed down, the LED 49, the LED 50 and the LED 51 are lit in turn. On the other hand, each time the DOWN switch 53 is pressed down, the setting temperature is decreased by 1° C., and eventually, the setting temperature can be decreased to +28° C. Each time the DOWN switch 53 is pressed down, the LED 47, and the LED 46 are lit in turn.

Figure 10:
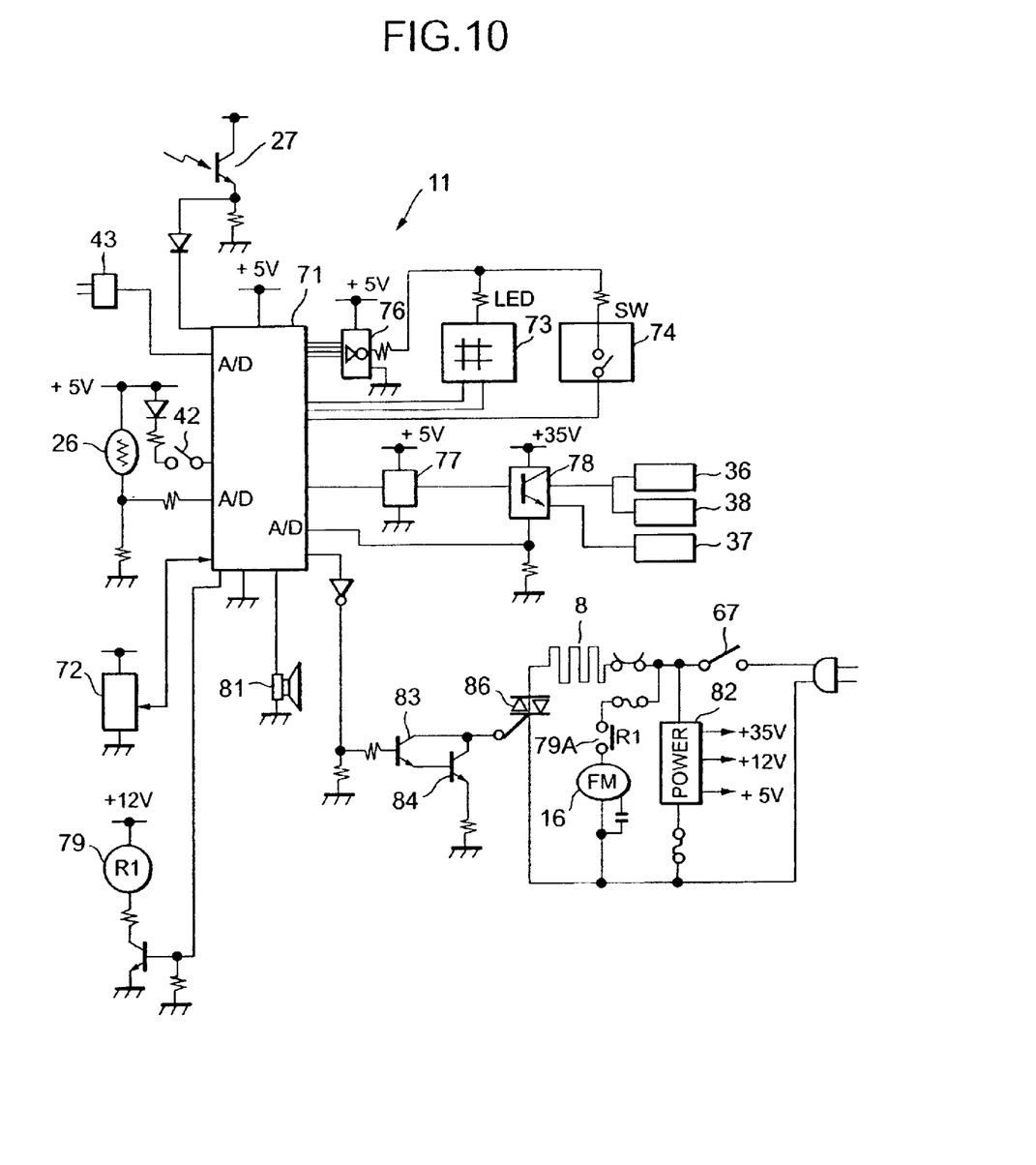
FIG. 10 is an electric circuit diagram of a control device of the foot warm bath equipment of FIG. 1.

FIG. 10 is an electric circuit diagram of the control device 11. The control device 11 comprises a general-purpose microcomputer 71 as control means. To the microcomputer 71, a terminal voltage output of the optical sensor 27, a contact output of the float switch 42, a terminal voltage output of the thermistor 26, and an output of the residual chlorine concentration sensor 43 are input. Reference numeral 72 denotes a memory comprising an erasable EEROM as storage means, and the memory is connected to the microcomputer 71.

Reference numeral 73 denotes a circuit for controlling lighting of the LEDs 46 to 51, 52, 57 to 60, and 62 to 64 on the control panel 2, and reference numeral 74 denotes a switch circuit comprising the switches 53, 54, 56, 61, 66 and 67 on the control panel 2. These circuits are connected to the microcomputer 71 via a buffer 76. The electrodes 36 to 38 are connected to the microcomputer 71 via a buffer 77 and an energization control circuit 78. Reference numeral 79 denotes a relay coil whose energization is controlled by the microcomputer 71 by use of a transistor, and reference numeral 81 denotes a beeper connected to the microcomputer 71.

The operation switch 67 on the control panel 2 is also connected to a commercial alternating-current power supply circuit, and subsequently to the operation switch 67, a power circuit 82 which generates direct-current voltages of +5 V, +12 V and +35 V, the electric heater 8, and the motor 16 for the sirocco fan 17 are connected. In this case, to the electric heater 8, a triac 86 whose gate is controlled by the microcomputer 71 by means of transistors 83 and 84 is connected in series, and energization is phase-controlled by the triac 86. Further, to the motor 16 for the sirocco fan 17, a contact point (constantly opened contact point) 79A of the relay coil 79 is connected in series, and the motor 16 is turned on or off by the contact point 79A.

Figure 11:
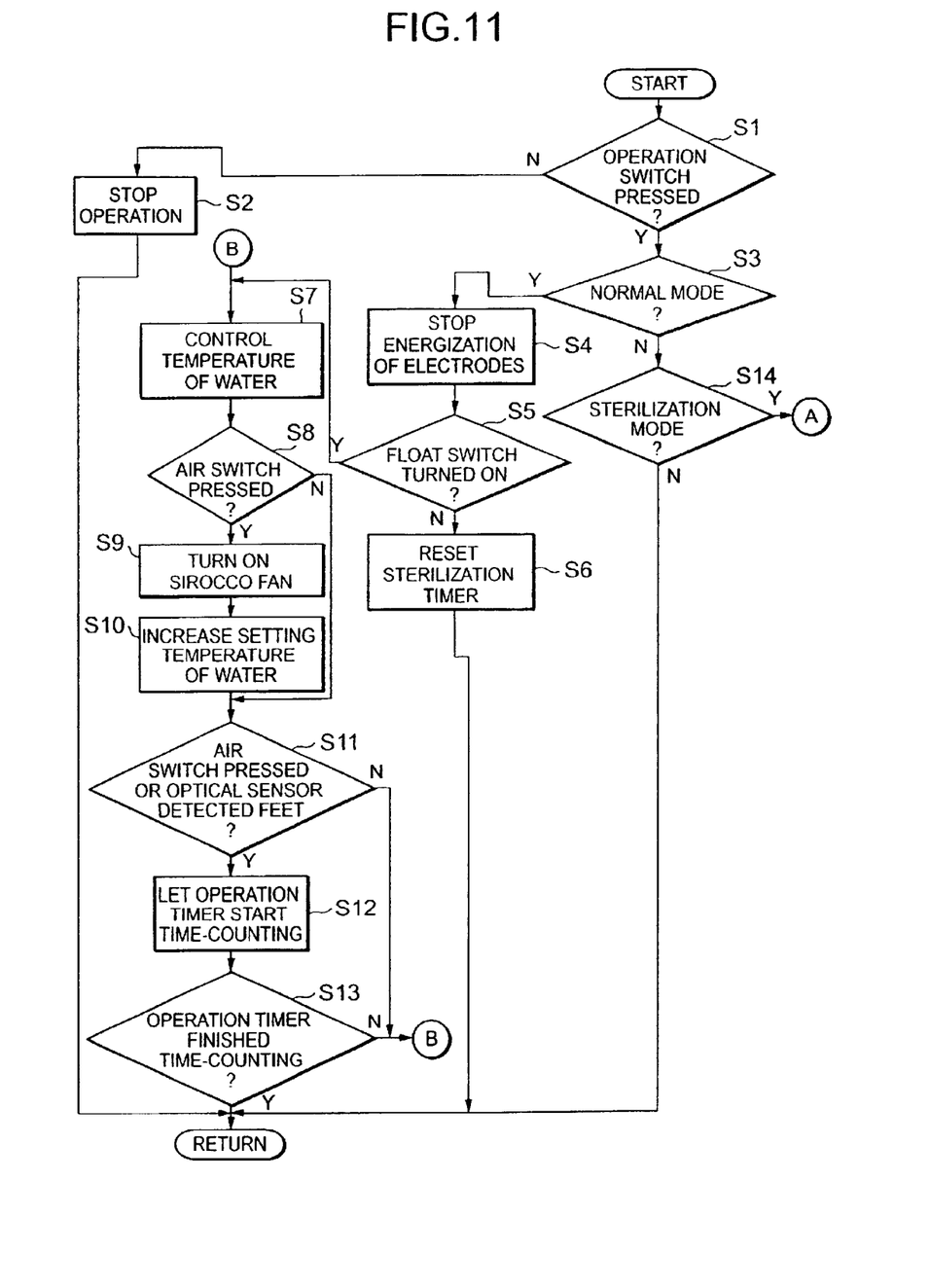
FIG. 11 is a flowchart for illustrating operations of a microcomputer of the control device of FIG. 10.
Figure 12:
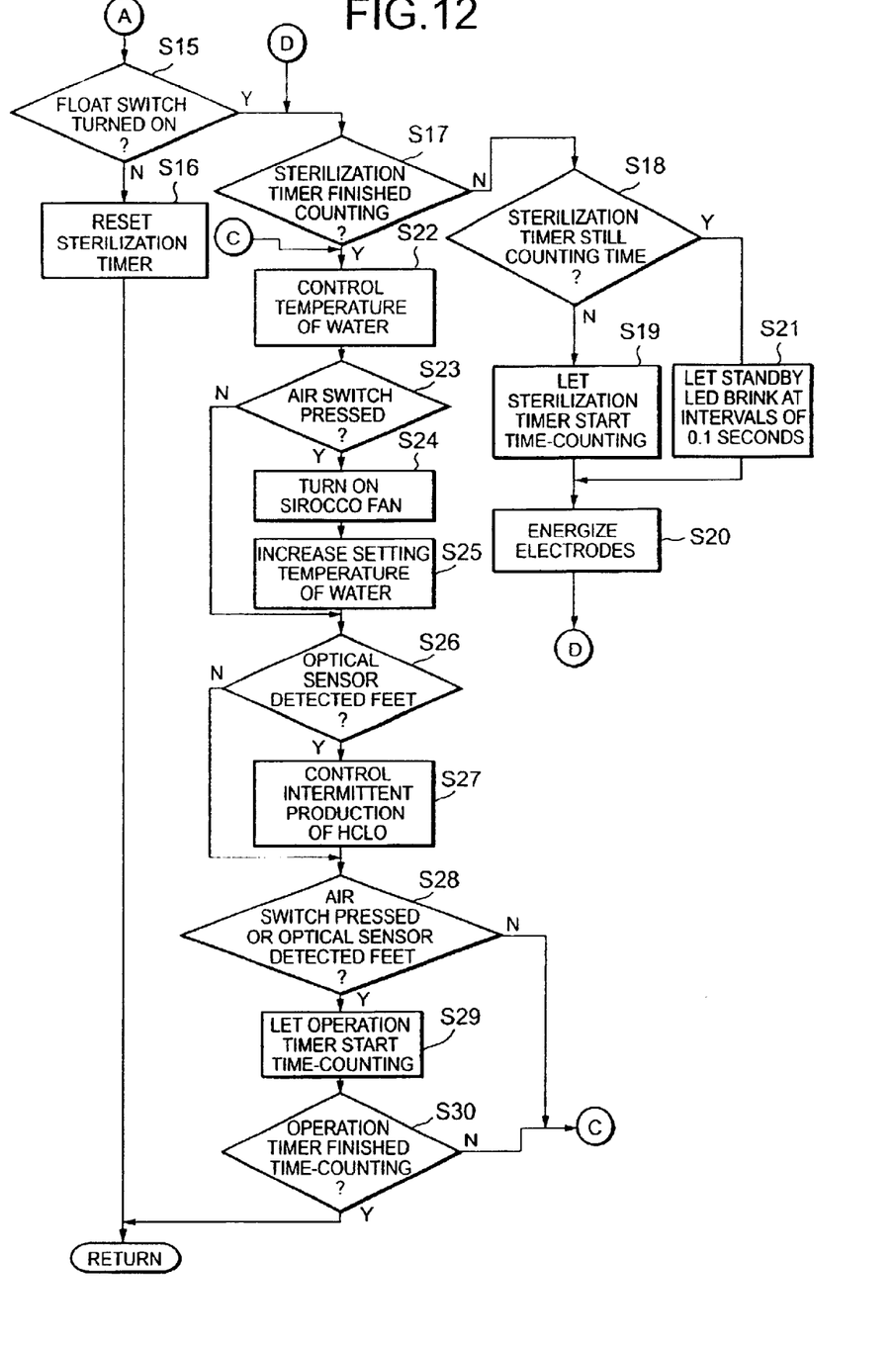
FIG. 12 is a flowchart for illustrating operations of the microcomputer of the control device of FIG. 10.

With the above constitution, operations of the foot warm bath equipment 1 of the present invention will be described. FIGS. 11 and 12 are flowcharts for illustrating control operations of the microcomputer 71 of the control device 11. The microcomputer 71 determines in STEP S1 whether the operation switch 67 on the control panel 2 has been pressed down, and if the switch 67 has not been pressed down, the microcomputer 71 proceeds to STEP S2 to stop operation of the equipment 1. It is now assumed that a user has poured water into the foot bath 6 and the water has reached, for example, the level of ankles with feet of the user placed at the bottom of the foot bath 6 (in reality, on the bedding part 14). The water also flows into the electrode box 22 through the slits 21 and other portions. At this water level, the electrodes 36 to 38 are completely submerged in the water, and the float switch 42 is turned on. If the operation switch 67 is pressed down in this condition, the microcomputer 71 lights the operation LED 68 and proceeds from STEP S1 to STEP S3 so as to determine whether the current mode is a normal mode.

(1) Operation in Normal Mode

If the mode switch 66 is not pressed down, the operation mode is initially a normal mode. Thus, the microcomputer 71 lights the normal mode LED 64 and proceeds from STEP S3 to STEP S4 so as to stop energizing the electrodes 36 to 38 (turning of the electrodes). Then, the microcomputer 71 determines in STEP S5 whether the float switch 42 is on. If the float switch 42 is on as described above, the microcomputer 71 proceeds to STEP S7.

If the water has not been poured into the foot bath 6 to the water level where the float switch 42 is turned on (or the water level where the electrodes 36 to 38 are completely submerged in the water), the microcomputer 71 proceeds from STEP S5 to STEP S6 so as to reset a sterilization timer which is a function of the microcomputer 71 and returns to STEP S1. That is, a certain water level is defined by the float switch 42, and the microcomputer 71 does not start the operation of the equipment 1 under the water level. Thereby, deteriorations of the electrodes 36 to 38 due to boil-dry by the electric heater 8 or energization in the absence of water in the control to be described can be prevented, and an excessive increase in the concentration of hypochlorous acid produced in the foot bath 6 by electrolysis by the electrodes 36 to 38 which will be described later can also be prevented.

Meanwhile, in STEP S7, the microcomputer 71 controls the temperature of the water in the foot bath 6. In this water temperature controlling step, the microcomputer 71 not only phase-controls energization of the electric heater 8 by means of the triac 86 to heat the water in the foot bath 6 so as to produce hot water but also adjust the temperature of the hot water to a setting temperature (any temperature between +28° C. and +33° C.) set by means of the UP switch 54 and the DOWN switch 53 and maintains the temperature of the hot water at the setting temperature based on a terminal voltage output of the thermistor 26 whose resistance value changes by detecting the temperature of the water in the foot bath 6. Then, the microcomputer 71 causes the beeper 81 to beep when the temperature of the hot water in the foot bath 6 reaches the setting temperature.

Then, the microcomputer 71 determines in STEP S8 whether the air switch 61 has been pressed or not. If the air switch 61 has not been pressed, the microcomputer 71 proceeds to STEP S11. In STEP S11, the microcomputer 71 determines whether the air switch 61 has been pressed or not or whether the optical sensor 27 has detected that feet have been inserted into the foot bath 6. If it is now assumed that the beeper 81 has made a beep to indicate that the user has inserted his feet into the foot bath 6, the microcomputer 71 proceeds to STEP S12 so as to start time-counting (time reduction) by an operation timer which is a function of the microcomputer 71. Although the operation timer is initially set at 15 minutes as described above, it can be set at a temperature between 5 minutes and 20 minutes in increments of 5 minutes through operation of the operation timer switch 56 as described above.

Then, the microcomputer 71 determines in STEP S13 whether the reduction by the operation timer is completed or not. If it is not completed, the microcomputer 71 returns to STEP S7. At this point, if the air switch 61 is pressed by the user, the microcomputer 71 lights the air generation LED 62 and proceeds from STEP S8 to STEP S9 to energize the relay coil 79 and close the contact point 79A so as to activate the motor 16 of the sirocco 17 (ON). Thereby, air bubbles are discharged from the discharge pores 13 of the bedding part 14 of the air bubble generating device 12 into the foot bath 6 so as to stir the hot water in the foot bath 6 and massage the feet.

Then, the microcomputer 71 proceeds to STEP S10 so as to increase the setting temperature of the hot water by 1° C. (for example, when the setting temperature is +30° C., it is increased to +31° C.). Thereby, the temperature of the hot water in the foot bath 6 a decrease of which is promoted by generation of the air bubbles can be maintained at a suitable temperature without any problems. Even when the air switch 61 is pressed in the absence of feet in the foot bath 6, the microcomputer 71 still proceeds from STEP S11 to STEP S12 so as to start reduction of the operation timer.

Then, when 15 minutes, for example, have elapsed since the start of the reduction of the operation timer and the reduction of the operation timer is completed, the microcomputer 71 returns from STEP S13 to STEP S1 so as to stop operation of the equipment 1.

(2) Operation in Sterilization Mode

Next, it is assumed that the mode switch 66 has been pressed once after press of the operation switch 67 so as to switch the operation mode to a sterilization mode. In this case, the microcomputer 71 lights the sterilization mode LED 63 and proceeds from STEP S3 to STEP S14 and then STEP S15 so as to determine whether the float switch 42 is ON or not as in the forgoing case. Then, if it is determined that the float switch 42 is ON as described above, the microcomputer 71 proceeds to STEP S17.

If water has not been poured into the foot bath 6 to the water level where the float switch 42 is turned on (or the water level where the electrodes 36 to 38 are completely submerged in the water), the microcomputer 71 proceeds from STEP S15 to STEP S16 so as to reset the sterilization timer and then returns to STEP Si as in the forgoing case. That is, a certain water level is defined by the float switch 42, and the microcomputer 71 does not start the operation of the equipment 1 under the water level. Thereby, deteriorations of the electrodes 36 to 38 due to boil-dry by the electric heater 8 or energization in the absence of water can be prevented, and an excessive increase in the concentration of hypochlorous acid produced in the foot bath 6 by electrolysis which will be described later can also be prevented.

Meanwhile, the microcomputer 71 determines in STEP S17 whether counting by the above sterilization timer is completed or not. Since, as a matter of course, the counting by the sterilization timer is not completed at this point, the microcomputer 71 proceeds to STEP S18 to determine whether the sterilization timer is counting time. If the sterilization timer is not counting time at that time, the microcomputer 71 proceeds to STEP S19 so as to cause the sterilization timer to start counting time.

Further, in STEP S19, the microcomputer 71 also sets the time of the sterilization timer, based on the concentration of residual chlorine in the water in the foot bath 6 which is output from the residual chlorine concentration sensor 43, such that the concentration of hypochlorous acid (HClO) produced in the foot bath 6 by electrolysis performed by the electrodes 36 to 38 which will be described later would be about 1 ppm. For foot warm bathing, the concentration of hypochlorous acid is suitably 1 to 2 ppm. In the case where the concentration of residual chlorine is normal, the concentration of hypochlorous acid (HClO) produced in the foot bath 6 by electrolysis performed by the electrodes 36 to 38 with a certain amount of water filled in the foot bath 6 of the present embodiment reaches, for example, about 1 ppm within 50 seconds (including start-up time).

Meanwhile, when the concentration of residual chlorine in the water is high, the production of hypochlorous acid by the electrolysis is boosted, while when the concentration of residual chlorine is low, the production of hypochlorous acid is reduced. Therefore, based on the concentration of residual chlorine in the poured water, the microcomputer 71 extends the time of the sterilization timer from 50 seconds by a predetermined amount of time when the concentration of residual chlorine is low, while the microcomputer 71 shortens the time of the sterilization timer from 50 seconds when the concentration of residual chlorine is high. Thereby, the concentration of hypochlorous acid in the foot bath 6 can be controlled to an appropriate value (about 1 ppm) accurately. Further, since the production of hypochlorous acid by electrolysis is also changed by the temperature of the water, the temperature of the water may be added to the setting time of the sterilization timer.

After setting the sterilization timer at a certain time (in this case, 50 seconds) and causing the timer to start counting time in STEP S19, the microcomputer 71 proceeds to STEP S20 so as to energize the electrodes 36 to 38 by means of the energization control circuit 78. In this case, as described above, a potential of the same polarity is applied to the electrodes 36 and 38, and a potential of the opposite polarity is applied to the opposed electrode 37. Thereby, electrolysis is conducted in the electrode box 22 so as to produce electrolytic water. Further, since the water moves back and forth between the inside of the foot bath 6 and the inside of the electrode box 22 through the slits 21, the electrolytic water is supplied into the foot bath 6.

The electrolytic water is slightly alkaline. In the electrolytic water in the electrode box 22, not only active oxygen but also hypochlorous acid (HClO) and hypochlorous acid ions (ClO$^-$) are produced. The electrolysis can be expressed by the following chemical formulae (1) to (4). Chemical Reactions on Electrode Functioning as Anode $$2H_2O \rightarrow 4H^+ + O_2\uparrow + 4e^- \tag{1}$$

$$2Cl^- \rightarrow Cl_2 + 2e^- \tag{2}$$

$$H_2O + Cl_2 \leftarrow\rightarrow HClO + H^+ + Cl^- \tag{3}$$

(Of these, $O_2$ and $Cl_2$ are diffused in air.)
Chemical Reaction on Electrode Functioning as Cathode $$2H_2O + 2e^- \rightarrow H_2\uparrow + 2OH^- \tag{4}$$

(Of these, $H_2$ is diffused in air.)

Then, the microcomputer 71 returns to STEP S17 so as to determine whether the sterilization timer has finished the counting. Since 50 seconds are not elapsed yet, the microcomputer 71 proceeds to STEP S18 so as to determine whether the sterilization timer is counting time. Since the sterilization timer is counting time in this case, the microcomputer 71 proceeds to STEP S21 so as to cause the standby LED 52 to blink (in red) at intervals of 0.1 seconds. Thereby, the microcomputer 71 notifies the user that the equipment is on standby for sterilization. Then, upon completion of the 50-second electrolysis, the concentration of hypochlorous acid in the foot bath 6 is about 1 ppm as described above since the counting by the sterilization timer is completed at this point, the microcomputer 71 proceeds from STEP S17 to STEP S22 so as to stop energization of the electrodes 36 to 38 and then control the temperature of the water in the foot bath 6.

In this water temperature controlling step, the microcomputer 71, as in the foregoing case, not only phase-controls energization of the electric heater 8 by means of the triac 86 to heat the water in the foot bath 6 so as to produce hot water but also adjust the temperature of the hot water to a setting temperature set by means of the UP switch 54 and the DOWN switch 53 and maintains the temperature of the hot water at the setting temperature based on a terminal voltage output of the thermistor 26. Then, as in the foregoing case, the microcomputer 71 causes the beeper 81 to beep when the temperature of the hot water in the foot bath 6 reaches the setting temperature.

In this case, if the temperature of the water in the foot bath 6 is high, the concentration of hypochlorous acid produced by the electrolysis conducted by the electrodes 36 to 38 becomes high. However, since the water in the foot bath 6 is heated so as to produce the hot water after the hypochlorous-acid-containing electrolytic water produced by the electrodes 36 to 38 is introduced into the foot bath 6 as described above, the concentration of hypochlorous acid in the foot bath 6 can be maintained at an appropriate value (about 1 ppm).

Then, the microcomputer 71 determines in STEP S23 whether the air switch 61 has been pressed or not. If it has not been pressed, the microcomputer 71 proceeds to STEP S26. In STEP S26, the microcomputer 71 determines whether feet have been detected in the foot bath 6. Assuming now that the beeper 81 has beeped to indicate that the user has inserted his feet into the foot bath 6, the microcomputer 71 proceeds from STEP S26 to STEP S27 so as to control intermittent production of hypochlorous acid.

Figure 13:
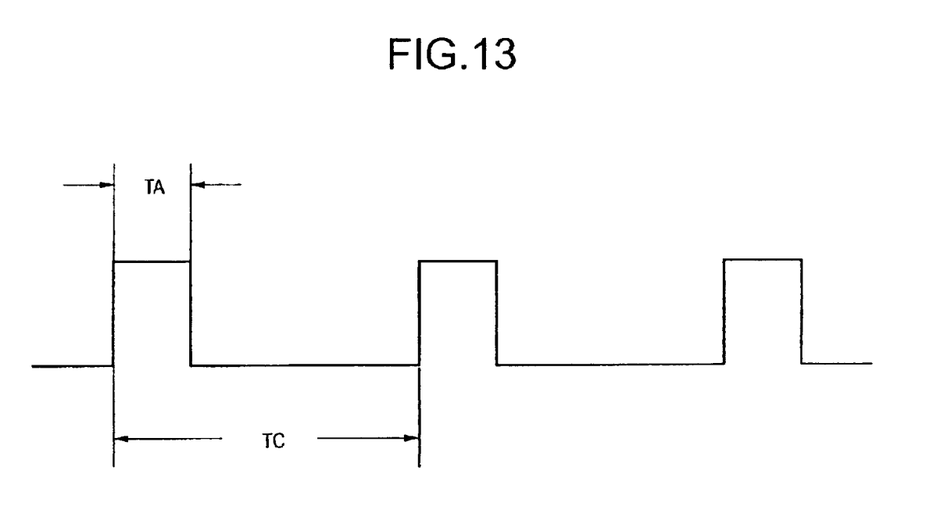
FIG. 13 is a timing chart for illustrating control of intermittent generation of hypochlorous acid by the foot warm bath equipment of FIG. 1.

In this step of controlling the intermittent production of hypochlorous acid, the microcomputer 71 energizes the electrodes 36 to 38 intermittently for a period of TC (3 minutes in the present embodiment) and an energization time of TA so as to repeat intermittent production of electrolytic water. Thereby, the concentration of hypochlorous acid which is constantly decomposed by contacting feet and the like in the foot bath 6 is maintained at an appropriate value (1 ppm). When the concentration of residual chlorine in water is a normal value, the energization time TA (electrolytic water production time) per production of the electrolytic water is 50 seconds (including start-up time). The microcomputer 71 determines the energization time TA based on a residual chlorine concentration detected by the foregoing residual chlorine concentration sensor 43. That is, when the concentration of residual chlorine is high, the microcomputer 71 adjusts the energization time TA to be shorter than 50 seconds, while when the concentration of residual chlorine is low, the microcomputer 71 adjusts the energization time TA to be longer than 50 seconds, so that the concentration of hypochlorous acid in the foot bath 6 would be about 1 ppm as describe above. Thereby, the concentration of hypochlorous acid produced by intermittent electrolysis can be controlled properly.

Thus, since electrolytic water containing hypochlorous acid is supplied into the foot bath 6 and the concentration of hypochlorous acid is retained by intermittent energization afterward, proliferation of saprophytic bacteria in the foot bath 6 can be prevented or suppressed and a sanitary foot warm bathing effect can be achieved. Further, since surfaces of skins of feet can also be sterilized, it is effective for prevention or comfortable relief of athlete's foot or prevention of occurrence of unpleasant odor.

Particularly, since the microcomputer 71 produces electrolytic water intermittently after feet are inserted into the foot bath 6, hypochlorous acid in hot water can be retained in an appropriate concentration during foot warm bathing, and the effect of preventing or suppressing proliferation of saprophytic bacteria in the warm bath and the effect of sterilizing the feet can be exhibited without any problems. Further, since electrolytic water is produced intermittently by means of the electrodes 36 to 38 based on an output from the optical sensor 27 on condition that feet are present in the foot bath 6, the electrolytic water is not produced when feet are not present in the foot bath 6, so that an excessive increase in the concentration of hypochlorous acid can be prevented and energy conservation can also be accomplished.

Then, the microcomputer 71 determines in STEP S28 whether the air switch 61 has been pressed or not or whether the optical sensor 27 has detected that feet have been inserted into the foot bath 6. If it is now assumed as in the forgoing case that the user has inserted his feet into the foot bath 6, the microcomputer 71 proceeds to STEP S29 so as to cause the above operation timer to start time-counting (time reduction). Although the operation timer is initially set at 15 minutes as in the forgoing case, it can be set at a temperature between 5 minutes and 20 minutes in increments of 5 minutes through operation of the operation timer switch 56 as described above.

Then, the microcomputer 71 determines in STEP S30 whether the reduction by the operation timer is completed or not. If it is not completed, the microcomputer 71 returns to STEP S22. At this point, if the air switch 61 is pressed by the user, the microcomputer 71 lights the air generation LED 62 as in the foregoing case and proceeds from STEP S23 to STEP S24 to energize the relay coil 79 and close the contact point 79A so as to activate the motor 16 of the sirocco 17 (ON). Thereby, air bubbles are discharged from the discharge pores 13 of the bedding part 14 of the air bubble generating device 12 into the foot bath 6 so as to stir hypochlorous acid in the hot water in the foot bath 6 and massage the feet.

Further, the microcomputer 71 proceeds to STEP S10 so as to increase the setting temperature of the hot water by 1° C. as in the foregoing case. Thereby, the temperature of the hot water in the foot bath 6 a decrease of which is promoted by generation of the air bubbles can be maintained at a suitable temperature without any problems.

In addition, in STEP S27 where intermittent production of hypochlorous acid is controlled, when the air switch 61 has been pressed and air bubbles are produced in the foot bath 6 as in the foregoing case, the microcomputer 71 extends the energization time TA (electrolytic water production time) per production of the electrolytic water. Thereby, more electrolytic water can be produced, so that the concentration of hypochlorous acid whose decomposition is promoted by contacting with feet can be maintained without any problems.

In place of extending the energization time TA as described above, the period TC may be shortened. As a result, more electrolytic water can also be produced, so that the concentration of hypochlorous acid whose decomposition is promoted by contacting with feet can also be maintained without any problems.

In this case, even when the air switch 61 is pressed without feet in the foot bath 6, the microcomputer 71 still proceeds from STEP S28 to STEP S29 so as to cause the operation timer to start the reduction.

Then, when 15 minutes, for example, have elapsed since the start of the reduction by the operation timer and the reduction by the operation timer is completed, the microcomputer 71 returns from STEP S30 to STEP S1 so as to stop operation of the equipment 1. Then, the microcomputer 71 calculates the sum of times during which the electrodes 36 to 38 have been energized and stores the sum in the memory 72 even when the power is turned off. Then, when the summed energization time reaches, for example, 60 minutes, the polarities of the potentials applied to the electrodes 36, 38 and 37 are switched to the opposite polarities. Thereby, an inconvenience that the efficiency of electrolysis lowers due to hard components (such as calcium and magnesium) stuck on the surface of the electrode serving as a cathode can be inhibited.

Although, in the present embodiment, air bubbles are produced in the foot bath 6 by the air bubble generating device 12, means for producing the air bubbles is not limited to the particular device, and a circulating water current may be produced in the foot bath 6 by means of a pump. Further, the concentrations and times are not limited to the particular values shown in the present embodiment and can be determined as appropriate according to the volume of the foot bath 6, the electrolyzing capabilities of the electrodes 36 to 38, and the like.

According to the present invention described in detail above, since the foot warm bath equipment which reserves hot water for foot bathing in a foot bath comprises the heating means for producing hot water of setting temperature by heating water in the foot bath, the electrolytic water producing means for producing electrolytic water containing hypochlorous acid by electrolysis of water and the control means for controlling these heating means and electrolytic water producing means and since electrolytic water produced by the electrolytic water producing means is fed into the foot bath, proliferation of saprophytic bacteria can be prevented or suppressed and a sanitary foot warm bathing effect can be achieved by hypochlorous acid fed into the foot bath.

Further, since surfaces of skins of feet can also be sterilized, an effect of promoting health by foot bathing can be further improved.

Further, according to the present invention, since the electrolytic water producing means electrolyzes the water in the foot bath, and the control means controls the electrolytic water producing means to produce electrolytic water on condition that the level of the water in the foot bath is equal to or higher than a predetermined value, an excessive increase in concentration of hypochlorous acid in the foot bath can be prevented, and the concentration of hypochlorous acid in hot water can be maintained at a proper value.

Further, according to the present invention, since the control means controls the heating means to heat the electrolytic water produced by the electrolytic water producing means, an inconvenience that the concentration of hypochlorous acid in the foot bath is increased higher than necessary by electrolysis of high-temperature water can be avoided in advance.

Further, according to the present invention, since the control means determines time for producing the electrolytic water by the electrolytic water producing means based on the concentration of chlorine remaining in the water, the concentration of hypochlorous acid in the foot bath can be maintained at a proper value accurately.

Further, according to the present invention, since the equipment has air bubble generating means for generating air bubbles in the foot bath, feet can be massaged by generated air bubbles, and a uniform concentration of hypochlorous acid in the foot bath can be achieved by stirring the hypochlorous acid in the foot bath. Further, since the control means raises the setting temperature of the hot water in the foot bath when air bubbles are generated by the air bubble generating means, the temperature of the hot water whose decrease is promoted by generation of the air bubbles can be maintained at a suitable value.

Further, according to the present invention, since the foot warm bath equipment which reserves hot water for foot bathing in a foot bath comprises the electrolytic water producing means for producing electrolytic water containing hypochlorous acid by electrolyzing water in the foot bath, proliferation of saprophytic bacteria can be prevented or suppressed and a sanitary foot warm bathing effect can be achieved by hypochlorous acid fed into the foot bath. Further, sterilization of surfaces of skins of feet can be performed.

Particularly, since the equipment has the control means for controlling the electrolytic water producing means and the control means controls the electrolytic water producing means to produce electrolytic water intermittently, hypochlorous acid in the hot water can be maintained in a predetermined concentration during foot warm bathing, and the effect of preventing or suppressing proliferation of saprophytic bacteria in the warm bath and the effect of sterilizing feet can be exhibited without any problems.

Further, according to the present invention, since the control means determines the time period in which electrolytic water is produced by the electrolytic water producing means, based on the concentration of chlorine remaining in the water in the foot bath, the concentration of hypochlorous acid generated by electrolysis can be controlled adequately.

Further, according to the present invention, since the equipment further comprises the air bubble generating means for generating air bubbles in the foot bath, feet can be massaged by the air bubbles, and efficient contact of the feet with hypochlorous acid can be achieved. Particularly, since the control means extends the time period in which electrolytic water is produced by the electrolytic water producing means so as to produce as much electrolytic water as possible when air bubbles are generated by the air bubble generating means, the concentration of hypochlorous acid whose decomposition is promoted by contacting with feet can be maintained without any problems.

Further, according to the present invention, since the equipment further comprises the air bubble generating means for generating air bubbles in the foot bath, feet can be massaged by the air bubbles, and efficient contact of the feet with hypochlorous acid can be achieved. Particularly, since the control means shortens the period in which electrolytic water is produced by the electrolytic water producing means so as to produce as much electrolytic water as possible when air bubbles are generated by the air bubble generating means, the concentration of hypochlorous acid whose decomposition is promoted by contacting with feet can be maintained without any problems.

Further, according to the present invention, since the equipment further comprises the foot detecting means for detecting that feet are put in the foot bath and the control means controls the electrolytic water producing means to produce electrolytic water intermittently based on an output from the foot detecting means on condition that feet are present in the foot bath, production of electrolytic water can be stopped when feet are not present in the foot bath, an excessive increase in the concentration of hypochlorous acid can be prevented, and energy conservation can be accomplished.

What is claimed is:

1. Foot warm bath equipment which reserves hot water for foot bathing in a foot bath, comprising:

heating means for heating water in the foot bath to produce hot water of setting temperature, electrolytic water producing means for electrolyzing the water in the foot bath to produce electrolytic water containing hypochlorous acid, and control means for controlling the heating means and the electrolytic water producing means to produce the electrolytic water on condition that the level of the water in the foot bath is equal to or higher than a predetermined value wherein the electrolytic water produced by the electrolytic water producing means is supplied into the foot bath.

2. The equipment of claim 1, wherein after the electrolytic water is produced by the electrolytic water producing means, the control means controls the heating means to heat the electrolytic water.

3. The equipment of claim 1, or 2, wherein after the control means determines a time period in which the electrolytic water is produced by the electrolytic water producing means based on the concentration of residual chlorine in the water.

4. The equipment of claim 1, or 2, which further comprises air bubble means for generating air bubbles in the foot bath, and the control means raises the setting temperature of the hot water in the foot bath when air bubbles are generated by the air bubble generating means.

5. Foot warm bath equipment which reserves hot water for foot bathing in a foot bath, comprising:

electrolytic water producing means for producing electrolytic water containing hypochlorous acid by electrolyzing water in the foot bath, and control means for controlling the electrolytic water producing means, wherein the control means controls the electrolytic water producing means to produce the electrolytic water intermittently; and air bubble generating means for generating air bubbles in the foot bath, and wherein the control means extends the time in which the electrolytic water is produced by the electrolytic water producing means when air bubbles are generated by the air bubble generating means.

6. The equipment of claim 5, wherein the control means determines time in which the electrolytic water is produced by the electrolytic water producing means based on the concentration of residual chlorine in the water in the foot bath.

7. Foot warm bath equipment which reserves hot water for foot bathing in a foot bath, comprising:

electrolytic water producing means for producing electrolytic water containing hypochlorous acid by electrolyzing water in the foot bath, and control means for controlling the electrolytic water producing means, wherein the control means controls the electrolytic water producing means to produce the electrolytic water intermittently; and air bubble generating means for generating air bubbles in the foot bath, and wherein the control means shortens a period in which the electrolytic water is produced by the electrolytic water producing means when air bubbles are generated by the air bubble generating means.

8. The equipment of claim 7, wherein the control; means determines the time during which the electrolytic water is produced by the electrolytic water producing means based on the concentration of residual chlorine in the water in the foot bath.

9. Foot warm bath equipment which reserves hot water for foot bathing in a foot bath, comprising:

electrolytic water producing means for producing electrolytic water containing hypochlorous acid by electrolyzing water in the foot bath, and control means for controlling the electrolytic water producing means, wherein the control means controls the electrolytic water producing means to produce the electrolytic water intermittently; and foot detecting means for detecting that feet are put in the foot bath, and wherein based on an output from the foot detecting means, the control means controls the electrolytic water producing means to produce the electrolytic water intermittently on condition that feet at present in the foot bath.

10. The equipment of claim 9, wherein the control means determines the time during which the electrolytic water is produced by the electrolytic water producing means based on the concentration of residual chlorine in the water in the foot bath.

* * * * *